Patented Mar. 16, 1948

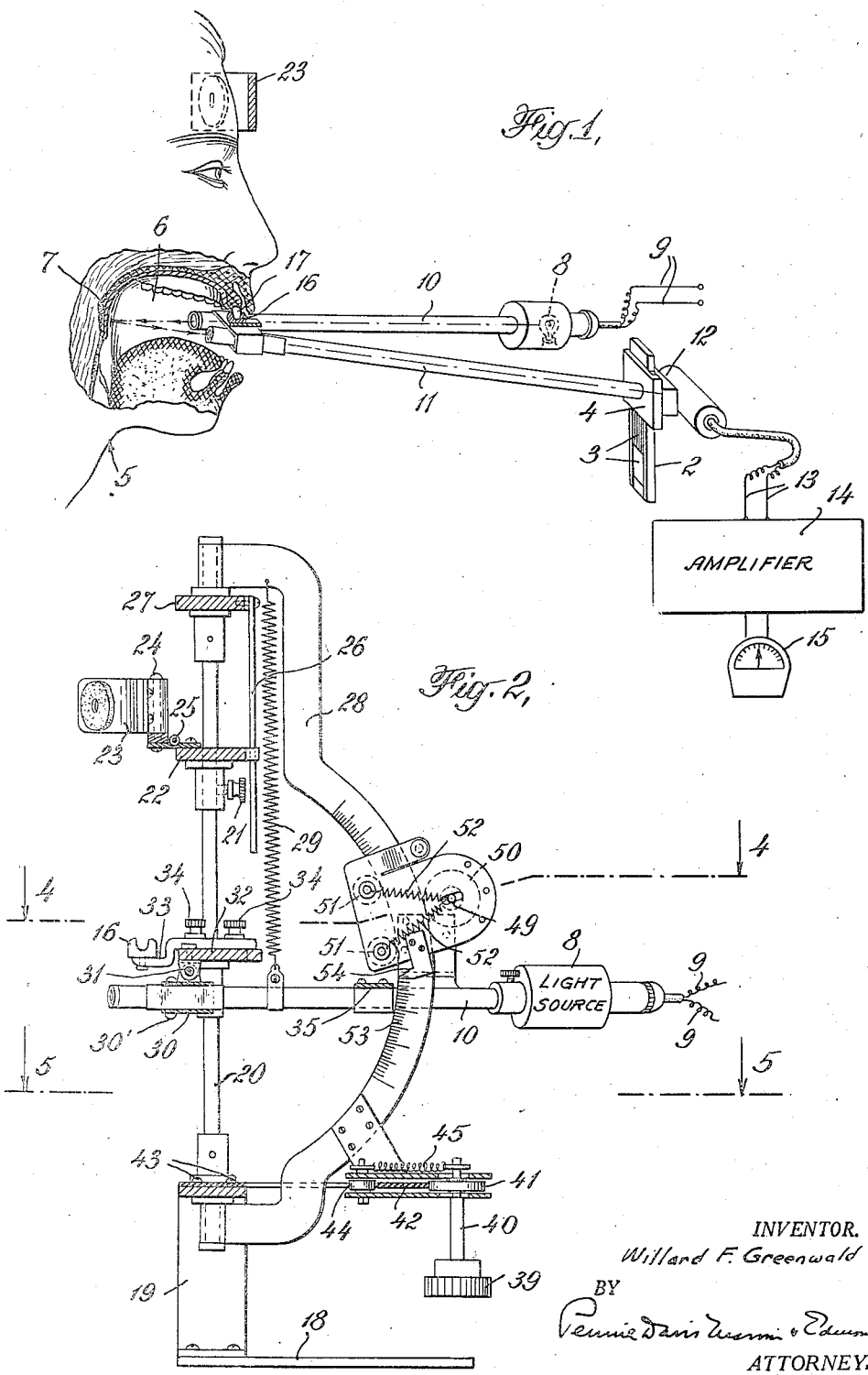

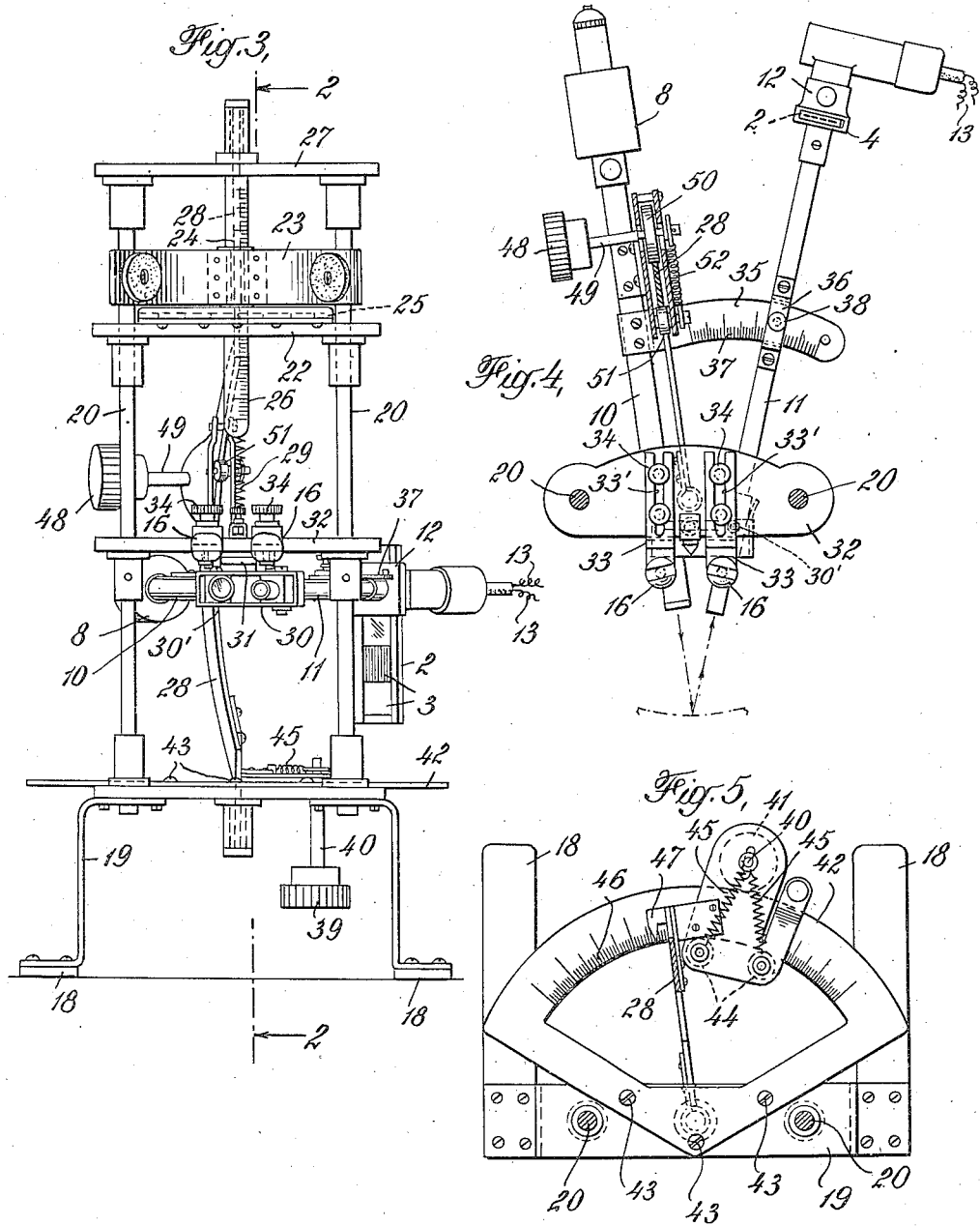

2,437,916

UNITED STATES PATENT OFFICE 2,437,916

APPARATUS FOR EXAMINING LIVING TISSUE

Willard F. Greenwald, Woodmere, N. Y., assignor to Philip Morris & Company, Ltd., Inc., New York, N. Y., a corporation of Virginia Application December 11, 1943, Serial No. 513,912

15 Claims. (Cl. 128—2)

This invention relates to a method and apparatus for determining changes in the coloration of living tissue, particularly changes which are due to the presence of inflammation in and other modifications of the tissue.

In the examination of patients, physicians are frequently dependent in some degree upon the changes in coloration of tissue as an aid in the diagnosis of pathological conditions. For example, the degree of redness of the pharynx is frequently an indication of inflammation when contrasted with the normal coloration. Changes in the coloration may indicate improvement or retrogression.

The physician has heretofore had no means of determining and recording in numerical terms the conditions and changes therein which he observes and considers in his diagnoisis. Such means will afford a desirable and important aid in the study of changes in living tissue.

It is the object of the present invention to provide a simple and effective method and apparatus whereby the coloration of living tissue can be determined in terms of data which when recorded afford a basis for comparison with data subsequently obtained in the examination of the same tissue. Such data can be related, for the purpose of discovering what if any changes have occurred and the nature of such changes.

Other objects and advantages of the invention will be apparent as it is better understood by reference to the following specification and the accompanying drawing, in which Fig. 1 is a diagrammatic illustration of the application of the principles involved in the method and apparatus;

Fig. 2 is a vertical section through an apparatus embodying the invention;

Fig. 3 is a front elevation of the apparatus;

Fig. 4 is a section on the line 4—4 of Fig. 2; and

Fig. 5 is a section on the line 5—5 of Fig. 2.

The invention depends upon the direction of a beam of light upon the tissue to be examined while the tissue is protected from other light source, the reflection of light from the tissue and the photoelectric measurement of the reflected light. Such measurements may be made after the light is passed through color screens. The measurements are indicated in terms of the electrical output of the photoelectric cell and the data thus obtained can be recorded. Subsequent examinations of the same tissue under the same conditions will afford additional data which can be correlated with that previously obtained. The operation may be conducted in a dark room to avoid interference by extraneous light.

Obviously it is necessary in successive examinations to direct the light upon the same tissue. Hence the apparatus is designed to permit the elements to be set in the same relative positions. Where the examination is directed at portions of the oral cavity, the teeth of the patient may be employed as an index to determine the primary position of the elements. Their relative positions are determined by suitable scales in the apparatus which permit adjustment of the parts to precisely the position which they occupied in a previous examination when the examination is repeated.

Referring to the drawing, 5 indicates the patient, 6 the oral cavity and 7 the pharynx which is the particular tissue to be examined. A light projecting device including a light source 8 which may be supplied with electric current for example through connections 9, is adapted to direct a beam of light through a tube 10. The tube may contain a rod of "Lucite," an acrylic acid type resin which is adapted to transmit light rays in straight lines, or it may have a suitable lens system whereby the beam of light is directed onto the pharynx 7.

Associated with the tube 10 is a reflected light conveying device including a second tube 11 which may likewise contain a rod of "Lucite" or a lens system to pick up light reflected from the pharynx 7 and deliver it to a photoelectric cell 12. The latter may be connected by conductors 13 to a standard form of amplifier 14 and galvanometer 15 whereby readings of the electrical output of the photoelectric cell are obtained. An adjustable member 2, provided with colored light screens 3 of red, blue and yellow, is disposed in a guide 4 so that the selected screen may be interposed in the beam of light. It is thus possible to resolve the light beam into various components and secure data which is useful in the determination of the conditions present.

To afford an index of the primary position of the tubes 10 and 11, they are connected and provided near their ends with sockets 16 to receive the upper front teeth 17 of the patient. Thus the position of the ends of the tubes in the oral cavity are fixed with reference to each patient. In the operation of the device, the teeth are disposed in the sockets. A tongue depressor of the usual form may be used to facilitate the examination. This device may, if desired, be incorporated in the apparatus. The pharynx is then subjected to the beam of light, and the light reflected therefrom is measured in terms of the output of the photoelectric cell both with and without the light screens. The data obtained is recorded and at subsequent examinations additional data may be secured and correlated with the data previously obtained.

To facilitate the application of the invention, the tubes 10 and 11 are mounted in a suitable support comprising for example a base 18 and a frame 19 which carries upright rods 20. Slidably supported on the rods 20 and securable by means of set screws 21 is a bar 22 carrying a headband 23 pivoted at 24 and 25. The headband is adapted to rest against the forehead of the patient as shown in Fig. 1. Straps (not shown) may be employed and adjusted to hold the headband in place. The vertical adjustment of the headband is determined with reference to a depending scale 26 secured to a bar 27 near the top of the rods 20. Thus the headband can be adjusted to fit the patient and thereafter readjusted to the same position when the patient is re-examined.

Pivoted on the frame 19 and bar 27 is a yoke or vertically extending member 28. A tension spring 29, secured to the yoke, is connected to the tube 10 to afford a resilient support therefor. The tube 10 is pivotally connected by a vertical pivot 30' to a support 30 which is movable in a vertical plane about a horizontal pivot 31 carried in a U-shaped bracket 31a which, in turn, is movable in a horizontal plane about a vertical pivot 31b extending from a bar 32 mounted on the rods 20. The bar 32 carries arms 33 with the pivoted tooth sockets 16 which are adapted to be engaged by the teeth of the patient. The arms 33 are formed with slots 33' and are engaged with set screws 34 to permit adjustment of the relative position of the tooth sockets 16.

Referring to Fig. 4 of the drawing, the tubes 10 and 11 are angularly adjustable with respect to each other. An arc 35 secured to the tube 10 and extending through a slotted bracket 36 on the tube 11 is provided with graduations 37. A set screw 38 permits the fixing of the tubes in the desired angular relation.

The tubes 10 and 11 are jointly movable about a vertical axis, together with the yoke 28. The adjustment is accomplished by means of a hand wheel 39 on a spindle 40 carrying a roller 41 which engages the edge of a quadrant 42 secured to the frame 19 by screws 43. Auxiliary rollers 44 are connected by springs 45 to the roller 41 and engage the opposite edge of the quadrant 42 to ensure effective operation. Any other form of mechanism for this purpose may be utilized. The quadrant 42 is provided with graduations 46 and an indicator 47 shows the relative angular position of the yoke 28 with respect to the frame 19. Thus the yoke may be reset in the desired position for re-examination of a patient.

The tubes 10 and 11 are also vertically adjustable jointly about the pivot 31. This adjustment is effected by a hand wheel 48 (Fig. 3) on a spindle 49 carrying a roller 50 which engages a portion of the yoke 28. Auxiliary rollers 51 are connected by springs 52 to the roller 50 to ensure effective operation. Any other manual means for effecting the adjustment can be utilized. The yoke 28 is provided with graduations 53 and an indicator 54 which permits resetting of the angular position of the tubes 10 and 11 about their pivot.

As is evident, the tubes 10 and 11 are relatively adjustable and coincidentally adjustable with reference to the index point established by the patient's teeth. The beam of light can therefore be directed by proper adjustment upon the desired tissue. In the operation of the device, the patient may be first seated before the instrument with the upper teeth in the sockets 16. The headband is then adjusted. Since the conformation of the skull and oral cavity in different patients varies widely, it is then necessary to adjust the tubes 10 and 11 so that the beam of light will be properly directed into the oral cavity. Adjustments are effected until the patient is comfortable and the light beam is directed upon the tissue to be examined and reflected through the tube 11 to the photoelectric cell. The data obtained with reference to the reflected light with and without color screen is recorded. At the same time, the various scale indications showing the relative positions of the parts of the instrument are recorded.

When the same patient is again examined, the several adjustments are effected so that the parts of the apparatus are in the same relative positions. When such adjustments have been made and the patient is again in position, the light beam will be directed upon the same tissue and a comparative reading can be secured. Repeated readings from day to day or at longer intervals will afford an accurate picture of the changes, if any, which have occurred in the coloration of the tissue examined, and from this information the physician can reach an accurate determination of the actual conditions and changes.

The method and apparatus as described afford a heretofore unavailable source of accurate information concerning changes occurring in living tissue. While the particular device as described is adapted more especially for examination of the oral cavity, it is apparent that the method may be utilized in the examination of other tissue and that the apparatus may be modified readily to facilitate its use for the intended purpose.

Although, when the device is used to examine the oral cavity, I prefer to use the teeth as an index or reference point of the primary position of the tubes, any other fixed point of the anatomy adjacent the oral cavity may be used. Instead of sockets to receive the upper front teeth, I may employ any suitable means to determine the position of apparatus with reference to the tissue to be examined.

Various changes may be made, therefore, in the procedure and especially in the apparatus described without departing from the invention or sacrificing the advantages thereof.

I claim:

1. An apparatus for determining changes in coloration of living tissue comprising a solid light-transmitting member, means for projecting a beam of light through said member upon the tissue to be examined, a second solid light-transmitting member for transmitting light reflected from the tissue, means adjustably connecting said members together near their respective portions where the projected light is emitted and the reflected light is received, means for indicating the relative adjustments of said light-transmitting members, whereby they subsequently may be reset to the same relative positions, a photoelectric cell carried by said second light-transmitting member and so positioned with respect thereto that it is in the path of reflected light passing though said second light-transmitting member, and means for measuring the electrical output of the photoelectric cell.

2. An apparatus for determining changes in coloration of living tissue which comprises a light-transmitting member, means for projecting a beam of light through said light-transmitting member and upon the tissue to be examined, a second light-transmitting means for transmitting light reflected from the tissue, means connecting said light-transmitting members together near their respective portions where the projected light is emitted and the reflected light is received, said connecting means providing for relative and coincidental adjustment of said light-transmitting members, means for indicating the relative adjustments of said light-transmitting members, whereby they subsequently may be reset to the same relative positions, a photoelectric cell disposed in the path of light transmitted through said second light-transmitting member, and means for measuring the electrical output of the photoelectric cell.

3. An apparatus for determining changes in coloration of living tissue in the human throat comprising a support having means engageable by the teeth to determine the spaced relation of the support with reference to the throat of the patient, means for projecting a beam of light upon a selected portion of the wall of the oral cavity, means for transmitting light reflected from such portion of the wall, means for connecting the light-projecting and reflected-light-transmitting means to the support at one side of the teeth-engaging means for relative adjustment with respect to each other and with respect to said support, means for indicating the relative adjustments of said light-transmitting members, whereby they subsequently may be reset to the same relative positions, a photoelectric cell carried by the reflected-light-transmitting means and disposed in the path of reflected light transmitted therethrough, and means for measuring the electrical output of the photoelectric cell.

4. An apparatus for determining changes in coloration of living tissue in the human throat comprising means for projecting a beam of light upon a selected portion of the wall of the oral cavity, means for transmitting light reflected from such portion of said wall, means connecting the light-projecting and light-transmitting means together near their respective portions where the projected light is emitted and the reflected light is received, means carried by said connecting means to permit relative pivotal adjustment of the light-projecting and light-transmitting means, a teeth-engaging member, said connecting means being pivoted for adjustment relative to said teeth-engaging means, whereby said respective portions of the light-projecting and light-transmitting means may be positioned relative to the portion of the wall of the oral cavity to be examined, means for indicating the relative adjustment of said light-projecting and light-transmitting means, whereby they subsequently may be re-set to the same relative positions, a photoelectric cell disposed in the path of reflected light transmitted through said reflected-light-transmitting means, and means for measuring the electrical output of said photoelectric cell.

5. An apparatus for determining changes in coloration of living tissue in the human throat as defined in claim 4 in which the means carried by said connecting means is so constructed and arranged as also to permit coincidental adjustment of the light-projecting and light-transmitting means.

6. An apparatus for determining changes in coloration of living tissue comprising a light-transmitting member, a source of light so positioned with respect to said light-transmitting member as to be projected therethrough upon the tissue to be examined, a second light-transmitting member for transmitting light reflected from such tissue, a bar, means carried by said bar connecting the light-transmitting members together near their respective portions where the projected light is emitted and the reflected light is received, means for indicating the relative adjustments of said light-transmitting members, whereby they subsequently may be reset to the same relative positions, a photoelectric cell carried by said second light-transmitting member and so positioned with respect thereto that it is in the path of reflected light passing through said second light-transmitting member, and an electrical meter for measuring the electrical output of the photoelectric cell.

7. An apparatus for determining changes in coloration of living tissue which comprises a light-transmitting member, a sources of light so positioned with respect to said light-transmitting member as to be projected therethrough upon the tissue to be examined, a second light-transmitting member for transmitting light reflected from such tissue, a bar, connecting means for the light-transmitting member carried by said bar, said connecting means being so constructed and arranged as to permit relative and coincidental adjustment of said transmitting members with respect to said bar, means for indicating the relative adjustments of said light-transmitting members, whereby they subsequently may be reset to the same relative positions.

8. An apparatus for determining changes in coloration of living tissue in the human throat comprising a light-transmitting member, a source of light so positioned with respect to said light-transmitting member as to be projected through the light-transmitting member upon a selected portion of the wall of the oral cavity, a second light-transmitting member for transmitting light reflected from such portion of the wall, a bar, means carried by said bar connecting said light-transmitting members together near their respective portions where the projected light is emitted and reflected light is received, a teeth-engaging member mounted on said bar, said light-transmitting members being adjustable relative to said bar to permit their said respective portions to be positioned relative to the portion of the wall of the oral cavity to be examined, scale means for indicating the relative adjustments of said light-transmitting members, whereby they subsequently may be reset at the same relative positions, a photoelectric cell disposed in the path of reflected light transmitted through said second light-transmitting member, and an electrical meter for measuring the electrical output of said photoelectric cell.

9. An apparatus for determining changes in coloration of living tissue in the human throat comprising a light-transmitting member through which light is adapted to be projected upon a selected portion of the wall of the oral cavity, a second light-transmitting member for transmitting reflected light from such portion of said wall, a bar, means carried by said bar connecting said light-transmitting members near their respective portions where light projected through said first light-transmitting member is emitted and the reflected light to be transmitted through said second light-transmitting member is received, a teeth-engaging member mounted on said bar, said light-transmitting members being relatively and coincidentally adjustable to permit them to be positioned relative to the portion of the wall of the oral cavity to be examined, scale means for indicating the relative adjustments of said light-transmitting members, whereby said members subsequently may be reset to the same relative positions, a photoelectric cell disposed in the path of reflected light transmitted through said second light-transmitting member, and an electrical meter for measuring the electrical output of said photoelectric cell.

10. An apparatus for determining changes in coloration of a specimen comprising a light-transmitting member, means for projecting a beam of light through said light-transmitting member and upon the specimen to be examined, a second light-transmitting member to transmit light reflected from the specimen, a support for said light-transmitting members, means adjustably connecting said light-transmitting members to said support, means for adjusting said light-transmitting members relative to one another, means for indicating the relative adjustment of said light-transmitting members, whereby they subsequently may be reset to the same relative positions, a photoelectric cell fixed relative to said second light-transmitting member in such position as to be disposed in the path of light transmitted therethrough, and means for measuring the electrical output of the photoelectric cell.

11. An apparatus for determining changes in coloration of a specimen comprising an acrylic acid type resin light-transmitting member, means for projecting a beam of light through said light-transmitting member and upon the specimen to be examined, a second acrylic acid type resin light-transmitting member to transmit light reflected from the specimen, a support for said light-transmitting members, means adjustably connecting said light-transmitting members to said support, means for adjusting said light-transmitting members relative to one another, means for indicating the relative adjustment of said light-transmitting members, whereby they subsequently may be reset to the same relative positions, a photoelectric cell carried by said second light-transmitting member and so positioned as to be disposed in the path of light transmitted therethrough and means for measuring the electrical output of the photoelectric cell.

12. An apparatus for determining changes in coloration of living tissue comprising a light-transmitting member, means for projecting a beam of light through said light-transmitting member upon the tissue to be examined, a second light-transmitting member to transmit light reflected from the tissue, a support for said light-transmitting members, means adjustably connecting said light-transmitting members to said support, means for adjusting said light-transmitting members relative to one another, means for indicating the relative adjustment of said light-transmitting members, whereby they subsequently may be reset to the same relative positions, a photoelectric cell fixed relative to said second light-transmitting member in such position as to be disposed in the path of light transmitted therethrough, color-filter means interposed between the second light-transmitting member and the photo-electric cell in the path of light transmitted by said second light-transmitting member and means for measuring the electrical output of the photoelectric cell.

13. An apparatus for determining changes in the coloration of living tissue comprising means for projecting a beam of light upon the tissue to be examined, an acrylic acid type resin light-transmitting member to transmit light reflected from the tissue, a support for said light-projecting means and said light-transmitting member, means adjustably connecting said light-projecting means and said light-transmitting member to said support, means for relatively adjusting the light-projecting means and the light-transmitting member, means for indicating the relative adjustment of said light-projecting means and the light-transmitting member, whereby they subsequently may be reset to the same relative positions, a photoelectric cell disposed in the path of light transmitted through said light-transmitting member, and means for measuring the electrical output of the photoelectric cell.

14. An apparatus for determining changes in color of a given specimen, comprising a main support, a light projecting device, a reflected-light transmitting device, means for connecting said devices to the main support, near their portions where the light respectively is projected and received, for relative and coincidental adjustment with respect to each other and with respect to the main support, a vertically-extending member carried on the main support for lateral adjustment with respect thereto, one of said devices being connected to said vertical member at a place removed from its point of connection with the main support, said one of the devices which is connected to the vertically-extending member being manually adjustable relatively to said vertically-extending member to effect coincidental adjustment of both devices, manually adjustable means for effecting the lateral adjustment of the vertically-extending member, and means for indicating the relative adjustment of said devices with respect to one another, their coincidental adjustment, and the lateral adjustment of the vertically-extending member, whereby said devices subsequenly may be reset to their same relative positions of adjustment.

15. An apparatus for determining changes in the coloration of living tissue in the human throat, comprising a main support having means adapted to be engaged by the teeth of the patient, a light-projecting device, a reflected-light transmitting device, means for connecting said devices to the main support immediately below the teeth-engaging means for relative and coincidental adjustment with respect to each other and with respect to the main support, a vertically-extending member carried on the main support and laterally adjustable with respect thereto, one of said devices being connected to said vertical member at a place removed from its point of connection with the main support, said one of the devices which is connected to the vertically-extending member being manually adjustable relatively to said vertically-extending member to effect coincidental adjustment of both devices, manually adjustable means for effecting the lateral adjustment of said vertically-extending member, and means for indicating the relative adjustment of said devices with respect to one another, their coincidental adjustment, and the lateral adjustment of the vertically-extending member, whereby said devices subsequently may be reset to their same relative positions of adjustment.

WILLARD F. GREENWALD.

REFERENCES CITED

The following references are of record in the file of this patent:

UNITED STATES PATENTS

| Number | Name | Date |
|---|---|---|
| 2,193,606 | Ulrey | Mar. 12, 1940 |
| 2,186,143 | Neugass | Jan. 9, 1940 |
| 2,215,211 | Deval | Sept. 17, 1940 |
| 2,204,809 | Miller | June 18, 1940 |
| 2,334,643 | Moore | Nov. 16, 1943 |
| 2,225,274 | MacGoun | Dec. 17, 1940 |
| 1,785,392 | Sanford et al. | Dec. 16, 1930 |

FOREIGN PATENTS

| Number | Country | Date |
|---|---|---|
| 537,683 | Germany | Nov. 5, 1931 |